Feb. 1, 1927.
R. H. SMICKLE
DOUBLE TUBE CONNECTION
Filed Feb. 27, 1926
1,616,146
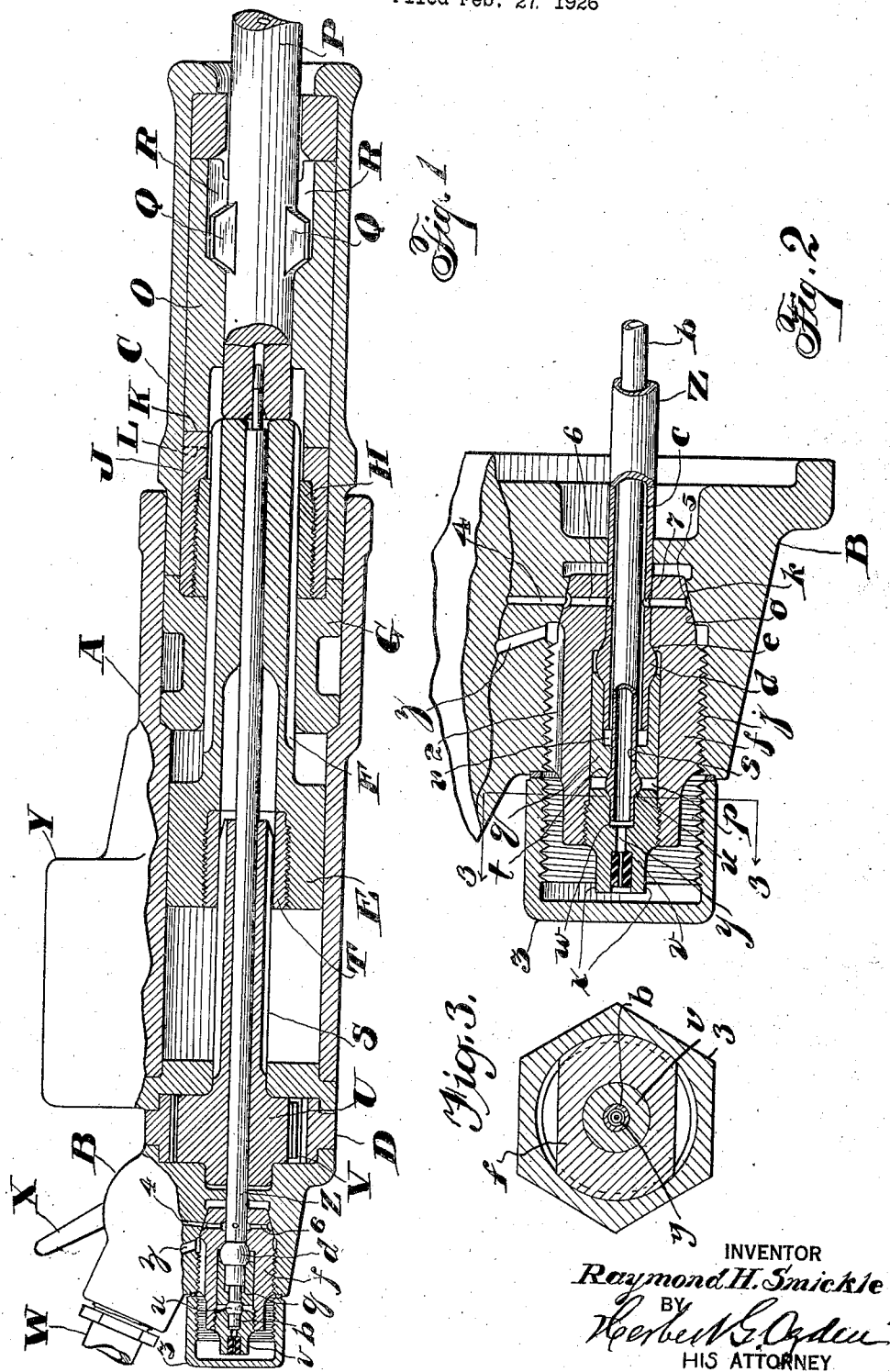
INVENTOR
Raymond H. Smickle
BY
Herbert G. Ogden
HIS ATTORNEY Patented Feb. 1, 1927.

1,616,146

UNITED STATES PATENT OFFICE.

RAYMOND H. SMICKLE, OF BELVIDERE, NEW JERSEY, ASSIGNOR TO INGERSOLL-RAND COMPANY, OF JERSEY CITY, NEW JERSEY, A CORPORATION OF NEW JERSEY.

DOUBLE TUBE CONNECTION.

Application filed February 27, 1926. Serial No. 91,095.

This invention relates to rock drills, but more particularly to fluid actuated rock drills of the hammer type which employ tubes for conveying pressure fluid and water to the drill steel for removing cuttings from the drilled hole.

The objects of the invention are to eliminate the chances of leakage of water into the percussive element of the rock drill and to lessen the number of parts comprising connections of this type.

Other objects will be in part obvious and in part pointed out hereinafter.

The invention consists of the combinations of elements, features of construction, and arrangement of parts having the general mode of operation substantially as hereinafter described and more particularly pointed out in the appended claims and illustrated in the accompanying drawings, in which—

Figure 1 is a longitudinal view, partly in section, of a rock drill equipped with a double tube connection constructed in accordance with the practice of the invention, Figure 2 is an enlarged detail view in longitudinal section of a portion of the back head of a rock drill illustrating more clearly the manner in which the tubes are supported, and Figure 3 is a transverse view taken through Figure 2 on the line 3—3 looking in the direction of the arrows.

Referring to the drawing, the invention is shown embodied in a rock drill having a cylinder A, a back head B and a front head C. Between the cylinder and the back head B is arranged a rotation ratchet D. The foregoing named parts comprise the casing of the rock drill and may be held in operative position with respect to each other in any suitable and convenient manner, preferably by the usual side bolts (not shown).

Within the cylinder A is a reciprocatory hammer piston E having a forward fluted extension F which extends through a front cylinder washer G and engages a correspondingly fluted rifle nut H supported by a chuck J. The chuck J in this instance is rotatable in the front head C and carries at its forward end clutch members K which interlock with similar clutch members L formed on a chuck jaw O. Disposed slidably within the chuck jaw O is a hollow drill steel P to receive the blows of the hammer piston E. The drill steel P in this instance is held against rotation with respect to the chuck jaw O by wings Q carried by the drill steel which engage suitable flats R formed in the forward end of the chuck jaw O.

Suitable means are provided for rotating the drill steel P through the interlocking chuck parts and the piston E. To this end a fluted rifle bar S engages a rifle nut T secured in the rearward end of the piston E and has a ratchet head U in which are arranged suitable spring pressed pawl devices V adapted to engage the rotation ratchet D during movement of the piston E in one direction, preferably during its rearward stroke. During the forward stroke of the piston E, the pawls V will be released from the rotation ratchet D and thus permit the drill steel P to remain stationary while the blow of the hammer piston is being delivered to said steel.

Pressure fluid for operating the drill is in this instance supplied through a suitable connection W secured to the back head B and the admission of such pressure fluid to the drill may be controlled by any suitable throttle valve (not shown) in the back head B and having a throttle lever X. Pressure fluid thus admitted to the drill may be distributed to the ends of the cylinder by a suitable valve (not shown) in a valve chest Y.

In accordance with the present invention, a pair of hollow tubes Z and $b$ are arranged longitudinally through the drill to convey cleansing fluid to the drilled hole for removing cuttings therefrom. In this instance the tubes are arranged concentrically with respect to each other and the outer tube Z serves as an air tube and is of sufficiently larger diameter than the tube $b$ so that a space or passage $c$ exists between the inner wall of the tube Z and the outer wall of the tube $b$. The tube Z is of a length to extend at its front end to a point near the rearward end of the drill steel P and carries near its rearward end a bulb $d$ which cooperates with a seat $e$ in a water plug $f$ and intermediate the ends thereof to hold said tube against longitudinal movement in one direction. The water plug $f$ in this instance has a screw threaded portion $j$ and a forward tapered portion $k$ which cooperates with a tapered seat *o* in the back head B to form a fluid tight joint and thus prevent leakage of water into the cylinder A.

Within the water plug *f* is formed a recess *p* into which is arranged slidably a sleeve *q* having a recess *r* of substantially the same diameter as the tube Z to receive the end of said tube. The sleeve *q* in this instance is also provided with a bore *s* which cooperates with the tube *b* for holding said tube concentrically within the tube Z. The bore *s* terminates at its rearward end in a seat *t* with which a bulb *u* formed on the tube *b* may cooperate to form a fluid tight joint. A plug *v* screwed into the end of the recess *p* is provided with a recess *w* to receive the end of the tube *b*. Flats *x* formed on opposite sides of the plug *v* provide a convenient means for screwing the plug *v* into the recess *p* thereby forcing the bulbs *u* and *d*, on the tubes *b* and Z respectively, firmly upon their seats. A passage *y* leading from the recess *w* to the outer end of the plug *v* is adapted to convey water to the tube *b*.

The tube *b* may communicate with a source of water supply (not shown) through a passage *z* formed in the back head B to communicate with a longitudinal groove 2 formed on the outer surface of the water plug *f*. A cap 3 screwed on the end of the water plug *f* serves to direct such water from the groove 2 to the passage *y* in the plug *v* and also to form a closure for the rearward ends of the water tube parts.

Pressure fluid may be supplied to the tube Z from any suitable source, preferably from the throttle valve, through a passage 4 formed in the back head B to communicate at its inner end with the tapered seat *o*, preferably at a point midway between the ends of said tapered seat. An annular groove 5 on the tapered portion *k* of the water plug *f* affords communication between the passage 4 and radial passages 6 in the water plug *f*. The passages 6 in this instance communicate with the interior of the tube Z through radial passages 7 formed through the wall of the tube, preferably forwardly of the bulb *d*.

In operation of the rock drill, the handle X is turned to the required position for admitting pressure fluid for operating the percussive element of the drill. In this position of the throttle valve, a portion of pressure fluid is admitted through the passages leading to the tube Z, from whence the pressure fluid will pass to the drill steel P. At the same time water may be admitted through the passages connecting the tube *b* with the water supply. The pressure of the water thus admitted is not at all times sufficient to raise the cuttings from the bottom of the drilled hole. Owing to the pressure fluid flowing through the tube Z under full line pressure, the water will be caused to intermingle with such pressure fluid and will thus be carried into the drilled hole with sufficient force to thoroughly flush the drilled hole and prevent the accumulation of cuttings on the rock face upon which the drill steel is operating.

This invention has been found to be efficient in operation, it is inexpensive in construction and comprises only a small number of parts. Other desirable advantages are that the parts comprising the tube assembly may be thoroughly sealed so that there will be no leakage of water into the interior of the rock drill and by means of this construction there are no compressible packings required, such as rubber or other similar materials, which frequently assume a set form and thus cause considerable leakage of water into the percussive element of the drill.

I claim:

1. In a fluid actuated rock drill, the combination of a back head with a water plug, a tapered portion on said water plug, a tapered seat in the back head to receive the tapered portion, a pair of concentrically arranged fluid conducting tubes in the water plug, a seat in said water plug for one of the tubes, a sleeve for holding said tubes in spaced relation with respect to each other and forming a seat for one of the tubes, and a plug in the water plug to cooperate with one of the tubes for holding the tubes firmly on their seats.

2. In a fluid actuated rock drill, the combination of a back head with a water plug, a tapered seat in the back head, a tapered portion on the water plug to cooperate with the tapered seat for forming a fluid tight joint, a pair of concentrically arranged fluid conducting tubes in the water plug, said tubes having bulbs near corresponding ends, a seat in the water plug and intermediate the ends thereof for the bulb on the outer tube, a sleeve in said water plug to cooperate with the bulbs for holding the tubes in spaced relation with respect to each other, a seat in said sleeve for the bulb on the inner tube, and a plug in the water plug cooperating with the bulb on the inner tube for forming fluid tight joints between the bulbs and their seats.

3. In a fluid actuated rock drill, the combination of a back head with a water plug, a tapered seat in the back head, a tapered portion on the water plug to cooperate with the seat for forming a fluid tight joint, a pair of concentrically arranged fluid conducting tubes in the water plug, said tubes having bulbs near corresponding ends, a tapered seat intermediate the ends of the water plug for the bulb on the outer tube, the outer tube having a plurality of radial passages, a sleeve in said water plug to cooperate with the bulbs for holding the tubes in spaced relation with respect to each other, a seat in said sleeve for the bulb on the inner tube, a plug in the water plug cooperating with the bulb on the inner tube for forming fluid tight joints between the bulbs and their seats, passages leading from a source of supply for conveying fluid to the inner tube, and passages through the tapered portion of the water plug communicating with a source of supply and with the radial passages in the outer tube for delivering fluid to said outer tube.

In testimony whereof I have signed this specification.

RAYMOND H. SMICKLE.